United States Patent
Rahman (10) Patent No.: US 10,511,650 B2
(45) Date of Patent: Dec. 17, 2019

(54) QUALITY OF SERVICE SYSTEM FOR A SERVICE PROVIDER THAT PROVIDES MEDIA CONTENT VIA A SATELLITE MEDIA DISTRIBUTION SYSTEM AND A TERRESTRIAL MEDIA DISTRIBUTION SYSTEM

(71) Applicant: AT&T INTELLECTUAL PROPERTY I, L.P., Atlanta, GA (US)

(72) Inventor: Moshiur Rahman, Marlboro, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 559 days.

(21) Appl. No.: 14/872,359

(22) Filed: Oct. 1, 2015

(65) Prior Publication Data
US 2017/0099337 A1    Apr. 6, 2017

(51) Int. Cl.
*H04L 29/06*    (2006.01)
*H04L 29/08*    (2006.01)

(52) U.S. Cl.
CPC .......... *H04L 65/80* (2013.01); *H04L 65/4084* (2013.01); *H04L 67/10* (2013.01); *H04L 67/322* (2013.01); *H04L 67/42* (2013.01)

(58) Field of Classification Search
CPC ..... H04L 65/80; H04L 67/10; H04L 65/4084; H04L 67/322; H04L 67/42
USPC ................... 709/203, 216, 217, 219; 714/26
See application file for complete search history.

(56) References Cited

U.S. PATENT DOCUMENTS

| | | | |
|---|---|---|---|
| 6,876,667 B1 | 4/2005 | Synnestvedt et al. | |
| 7,394,761 B2 | 7/2008 | Foster et al. | |
| 7,804,856 B2 | 9/2010 | Krause et al. | |
| 8,014,771 B2 | 9/2011 | Bettinger et al. | |
| 8,107,457 B2 | 1/2012 | White et al. | |

(Continued)

FOREIGN PATENT DOCUMENTS

| | | |
|---|---|---|
| DE | 102010007418 A1 | 8/2011 |
| FR | 2984640 A1 | 6/2013 |
| WO | 2010088295 A1 | 8/2010 |

OTHER PUBLICATIONS

Arsinte, R., "An Experimental Architecture for Basic IPTV Concepts Implementation and Testing" Acta Technica Napocensis-Electronics & Telecommunications, vol. 49, No. 4, Oct. 2008, pp. 15-16.

(Continued)

*Primary Examiner* — Zi Ye
(74) *Attorney, Agent, or Firm* — Toler Law Group, PC (57) ABSTRACT

A method includes receiving, at a processor of a server, first quality of service (QoS) data from a first device and second QoS data from a second device. The first QoS data is associated with a satellite media distribution system (MDS) and the second QoS data is associated with a terrestrial MDS. The method includes performing an analysis of the first QoS data and the second QoS data at the processor and identifying a quality of service issue based on the analysis. The method also includes, in response to a first determination that the QoS issue is caused by a combined content source of the satellite MDS and the terrestrial MDS, sending a first notice related to the QoS issue from the processor to a component of the combined content source, a device associated with maintenance personnel for the combined content source, or both.

20 Claims, 3 Drawing Sheets

(56) References Cited

U.S. PATENT DOCUMENTS

| | | | |
|---|---|---|---|
| 8,184,549 B2 | 5/2012 | Wiley et al. | |
| 8,249,141 B1 | 8/2012 | Harris et al. | |
| 8,489,923 B1* | 7/2013 | Lakshminarayanan | H04N 21/2662 709/203 |
| 8,743,703 B2 | 6/2014 | Heinz et al. | |
| 8,769,047 B1 | 7/2014 | Coppola et al. | |
| 8,892,960 B2* | 11/2014 | Sambamurthy | G06F 11/079 714/47.3 |
| 8,913,509 B2 | 12/2014 | Kamdar et al. | |
| 2003/0046633 A1 | 3/2003 | Jutzi | |
| 2003/0054816 A1 | 3/2003 | Krebs et al. | |
| 2003/0212999 A1 | 11/2003 | Cai | |
| 2005/0249139 A1 | 11/2005 | Nesbit | |
| 2006/0224402 A1* | 10/2006 | Hanna | G06Q 10/06 705/34 |
| 2008/0049629 A1 | 2/2008 | Morrill | |
| 2008/0271094 A1 | 10/2008 | Kliger et al. | |
| 2009/0089184 A1* | 4/2009 | Boush | G06F 17/30017 705/26.1 |
| 2009/0207866 A1 | 8/2009 | Cholas et al. | |
| 2009/0257345 A1 | 10/2009 | King | |
| 2011/0286355 A1 | 11/2011 | Snapir et al. | |
| 2012/0213210 A1 | 8/2012 | Thomasson et al. | |
| 2014/0043973 A1* | 2/2014 | Groenendijk | H04L 41/5032 370/230 |
| 2014/0043977 A1 | 2/2014 | Wiley et al. | |
| 2015/0172149 A1 | 6/2015 | Coppola et al. | |
| 2016/0012656 A1 | 1/2016 | Chuang et al. | |

OTHER PUBLICATIONS

Cooper, W., "Peering Into The Future of Digital Media Distribution", Informity, UK, Retrieved from http://www.ibc-show.com/IBC2007/Chas/Latest%20Pdfs/1240%20cooper.pdf, Retrieved Jul. 2015, 8 pages.

Ehlert, S. et al., "Optimization of Multicast Protocols for Heterogeneous Satellite Networks", Proceedings of First International Confer4ence on Advanced Satellite Mobile Systems, ASMS-2003, Jul. 2003, 9 pages.

Rasheed, Y. et al., "High-Quality Media Distribution in the Digital Home"; Intel Technology Journal, Interoperable Home Infrastructure, Intel Corporation, vol. 06, Issue 04, Nov. 15, 2002, pp. 17-29.

Sun, Z. et al., "Scalable Architecture and Evaluation for Multiparty Conferencing Over Satellite Links", IEEE Journal on Selected Areas in Communications, vol. 22, Issue 3, Apr. 2004, pp. 594-605.

* cited by examiner

FIG. 3

QUALITY OF SERVICE SYSTEM FOR A SERVICE PROVIDER THAT PROVIDES MEDIA CONTENT VIA A SATELLITE MEDIA DISTRIBUTION SYSTEM AND A TERRESTRIAL MEDIA DISTRIBUTION SYSTEM

FIELD OF THE DISCLOSURE

The present disclosure is generally related to a quality of service system for a service provider that provides media content via a satellite television system and a terrestrial television system.

BACKGROUND

Service providers may use media distribution systems (MDSs) to provide media content to subscribers. One type of media distribution system is a satellite MDS. For a satellite MDS, a content source receives media content from content providers for multiple channels provided by the service provider. The content source processes the media content (e.g., adds commercial content, encodes the media content, and multiplexes the media content) and provides multiplexed content to one or more satellite hub offices. The satellite hub offices may further process the multiplexed content (e.g., decode, add content, encode, and multiplex) and upload the processed multiplexed media content at an appropriate time to one or more orbiting satellites. The one or more orbiting satellites download the processed multiplexed media content to subscribers.

Another type of MDS is a terrestrial MDS. A terrestrial MDS is a MDS that provides media content to subscribers by means other than download from one or more orbiting satellites. Terrestrial MDSs may include, but are not limited to, cable distribution systems, internet protocol television systems, land based wireless MDSs, or combinations thereof. For a terrestrial MDS, a content source receives media content from content providers for multiple channels provided by the service provider. The content source processes the media content (e.g., adds commercial content, encodes the media content, and multiplexes the media content) and provides multiplexed content to one or more head ends. The one or more head ends may further process the multiplexed content and distribute media content of the processed multiplexed content to subscribers via one or more terrestrial networks.

DETAILED DESCRIPTION

A service provider may provide media content to first subscribers via a satellite MDS and may provide media content to second subscribers via a terrestrial MDS. An analytics server may leverage sets of subscriber data to identify QoS issues of a combined content source for the satellite MDS and the terrestrial MDS, to identify QoS issues of the satellite MDS, to identify QoS issues of the terrestrial MDS, or combinations thereof. The analytics server may perform an analysis of first QoS data received from customer premises equipment (CPE) devices associated with the satellite MDS and second QoS data received from CPE devices associated with the terrestrial MDS. The analysis may be used to identify one or more QoS issues associated with the combined content source, associated with the satellite MDS, associated with the terrestrial MDS, or associated with combinations thereof. Leveraging sets of subscriber data may enable identification of QoS issues before the issues result in reductions in QoS noticeable to subscribers, may reduce costs in identifying and responding to QoS issues, may reduce a response time to respond to QoS issues, may identify particular systems or network devices of the service provider systems associated with the QoS issues, or combinations thereof.

In an illustrative embodiment, a method includes receiving, at a processor of a server, first quality of service (QoS) data from a first device and second QoS data from a second device. The first QoS data is associated with a satellite media distribution system (MDS) and the second QoS data is associated with a terrestrial MDS. The method includes performing an analysis of the first QoS data and the second QoS data at the processor and identifying a quality of service issue based on the analysis. The method also includes, in response to a first determination that the QoS issue is caused by a combined content source of the satellite MDS and the terrestrial MDS, sending a first notice related to the QoS issue from the processor to a component of the combined content source, a device associated with maintenance personnel for the combined content source, or both.

In an illustrative embodiment, a system includes a processor and a memory in communication with the processor. The memory includes instructions executable by the processor to perform operations. The operations include receiving first QoS data from a first device and second QoS data from a second device. The first QoS data is associated with a satellite MDS and the second QoS data is associated with a terrestrial MDS. The operations include performing an analysis of the first QoS data and the second QoS data and identifying a quality of service issue based on the analysis. The operations also include, in response to a first determination that the QoS issue is caused by a combined content source of the satellite MDS and the terrestrial MDS, sending a first notice related to the QoS issue to a component of the combined content source, a device associated with maintenance personnel for the combined content source, or both.

In an illustrative embodiment, a computer-readable device includes instructions executable by a processor to perform operations. The operations include receiving first QoS data from a first device and second QoS data from a second device. The first QoS data is associated with a satellite MDS and the second QoS data is associated with a terrestrial MDS. The operations include performing an analysis of the first QoS data and the second QoS data and identifying a quality of service issue based on the analysis. The operations also include, in response to a first determination that the QoS issue is caused by a combined content source of the satellite MDS and the terrestrial MDS, sending a first notice related to the QoS issue to a component of the combined content source, a device associated with maintenance personnel for the combined content source, or both.

Figure 1:
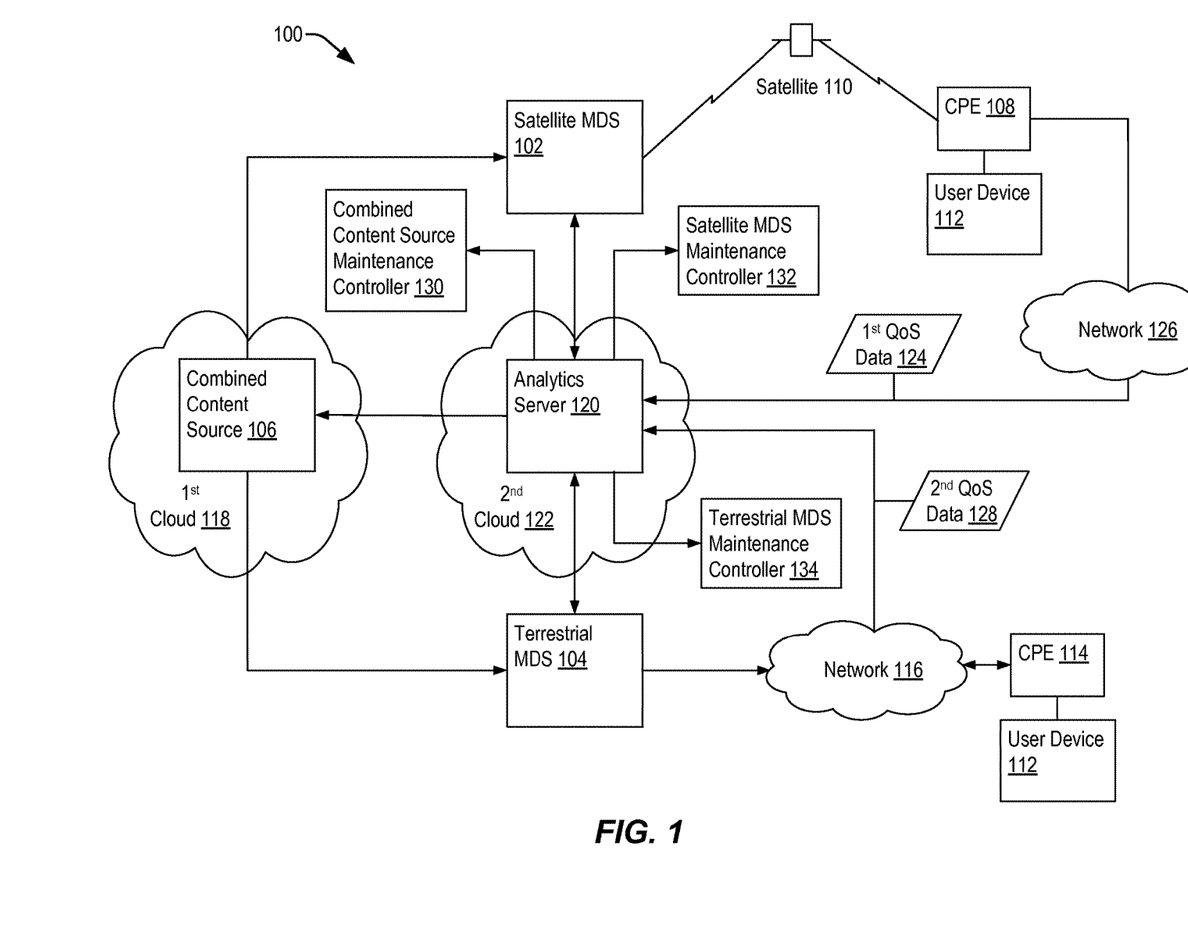
FIG. 1 is a block diagram of a quality of service system for a service provider that provides media content via a satellite media distribution system and a terrestrial media distribution system.

FIG. 1 is a block diagram that illustrates a particular embodiment of a system 100 associated with a service provider that provides media content to subscribers via a satellite MDS 102 and a terrestrial MDS 104. The satellite MDS 102 may include at least one satellite hub office that receives multiplexed content from a combined content source 106 and transmits requested media content included in the multiplexed content to CPE devices 108 of subscribers via one or more satellites 110. The CPE devices 108 may send requested media content to one or more user devices 112. The user devices 112 may include media devices (e.g., set-top box devices and gaming systems) coupled to output devices (e.g., display devices and audio systems), televisions, computer systems (e.g., desktop computers and laptop computers), portable communication devices (e.g., mobile communication devices and tablet computers), other devices capable of receiving media content received via the satellite MDS or the terrestrial MDS, or combinations thereof.

The terrestrial MDS 104 may include at least one head end that receives multiplexed content from the combined content source 106 and transmits requested media content included in the multiplexed content to CPE devices 114 of subscribers via one or more terrestrial networks 116. The requested media content may be sent as part of a multiplexed content stream, as multicast content, as unicast content, by another transmission method, or by combinations thereof. The one or more terrestrial networks 116 may include cable networks, public networks (e.g., the internet), private networks, mobile communication networks, or combinations thereof. The CPE devices 114 may send the requested media content to one or more user devices 112.

The combined content source 106 may be in a first cloud 118 (i.e., a system enabled to perform operations using distributed processing at multiple network devices). The combined content source 106 may include, but is not limited to, a receiving antenna farm, receivers, encoders, multiplexers, servers, other network devices, or combinations thereof. The combined content source 106 may receive media content from content providers via the antenna farm and the receivers. The media content may include television programming, pay-per-view content, media-on-demand content, other media content, or combinations thereof. The combined content source 106 may process received media content to produce a multiplexed stream of channels for distribution via the satellite MDS 102, the terrestrial MDS 104, or both. A first multiplexed stream sent to the satellite MDS 102 by the combined content source 106 at a particular time may be different than a second multiplexed stream sent to the terrestrial MDS 104 at the particular time because of variations in media content carried by the channels of the satellite MDS 102 as compared to the channels of the terrestrial MDS 104. Thus, while content is provided from a single combined source (i.e., the combined content source 106), different content streams may be provided to the satellite MDS 102 and the terrestrial MDS 104.

The system 100 may include an analytics server 120 in a second cloud 122 (i.e., the analytics server may include a number of servers at different locations that use distributed processing to perform tasks). The analytics server may receive first QoS data 124 from CPE devices 108 of the satellite MDS 102 via one or more networks 126 and second QoS data 128 from CPE devices 114 of the terrestrial MDS 104 via the one or more terrestrial networks 116. The one or more networks 126 may include cable networks, public networks (e.g., the internet), private networks, mobile communication networks, or combinations thereof.

The first QoS data 124 may include information related to QoS received by the CPE devices 108 for requested media content. The analytics server 120 may receive the first QoS data 124 from all CPE devices 108 of the satellite MDS 102 or from a particular set of CPE devices 108 that is representative of subscribers of the satellite MDS 102. For each CPE device 108 that sends the first QoS data 124 to the analytics server 120, the first QoS data 124 may include, but is not limited to, identification information of the CPE device 108, identification of particular media content received (e.g., an identification number and identification of a resolution of the media content), jitter information, dropped packet information, latency information, number of packet retransmission requests made by the CPE device 108, time information, other data pertaining to QoS, or combinations thereof.

The second QoS data 128 may include information related to QoS received by the CPE devices 114 for requested media content. The analytics server 120 may receive the second QoS data 128 from all CPE devices 114 of the satellite MDS 102 or from a particular set of CPE devices 114 that is representative of subscribers of the terrestrial MDS 104. For each CPE device 114 that sends second QoS data 128 to the analytics server 120, the second QoS data 128 may include, but is not limited to, identification information of the CPE device 108, identification of particular media content received, jitter information, dropped packet information, latency information, number of packet retransmission requests made by the CPE device 114, time information, other data pertaining to QoS, or combinations thereof.

The analytics server 120 may perform an analysis of the first QoS data 124 and the second QoS data 128. The analysis may generate satellite MDS performance metrics and trends for the satellite MDS 102 from the first QoS data 124. The analysis may also generate terrestrial MDS performance metrics and trends for the terrestrial MDS 104 from the second QoS data 128.

The analytics server 120 may determine whether one or more QoS issues are identified based on the analysis. The one or more QoS issues may be identified based on comparisons of satellite MDS performance metrics, trends for the satellite MDS performance metrics, or both, to satellite MDS thresholds; based on comparisons of terrestrial MDS performance metrics, trends for the terrestrial MDs performance metrics, or both, to terrestrial MDS thresholds; based on comparisons of particular satellite MDS performance metrics to corresponding terrestrial MDS performance metrics, based on other comparisons; or based on combinations thereof. The satellite MDS thresholds and the terrestrial MDS thresholds may enable detection of QoS issues before the QoS issues result in noticeable changes to QoS of media content provided to subscribers. The analytics server 120 may use pre-defined logical rules and data signatures based on usage history to identify patterns, anomalies, or both, that indicate QoS issues.

When the analytics server 120 identifies one or more QoS issues, the analytics server 120 may determine one or more causes of the one or more QoS issues based on the analysis and network topology (e.g., logical and physical) of the combined content source 106, the satellite MDS 102, and the terrestrial MDS 104. The analytics server 120 may associate the QoS issue with the combined content source 106, with the satellite MDS 102, with the terrestrial MDS 104, or with combinations thereof. The analytics server 120 may assign probabilities associated with the one or more QoS issues being associated with systems 102-106, with particular network devices of the systems 102-106, or with combinations thereof. The assignments of probabilities may be based on QoS data received from the systems 102-106 by the analytics server 120. When a probability that a QoS issue is caused by a particular system is above a particular threshold, the analytics server 120 may associate the problem with the particular system. The QoS issue may be associated with more than one of the combined content source 106, the satellite MDS 102, and the terrestrial MDS 104.

When the analytics server 120 determines that a QoS issue is associated with the combined content source 106, the analytics server 120 may send a first notice related to the QoS issue to at least one component of the combined content source 106, to a maintenance controller 130 for the combined content source 106, or both. When the first notice is sent to the at least one component of the combined content source 106, the first notice may include one or more instructions to overcome the QoS issue. When the first notice is sent to the maintenance controller 130, the first notice may identify the QoS issue, may identify one or more likely causes of the QoS issue and probabilities that the one or more likely causes are the cause, may identify recommended tasks to be scheduled by the maintenance controller 130 for maintenance personnel, may identify whether one or more instructions where sent to the at least one component of the combined content source 106 and what the instructions where configured to achieve, may include other information, or combinations thereof. The maintenance controller 130 may automatically perform certain tasks or schedule maintenance personnel to perform particular tasks based on the first notice to overcome the QoS issue.

When the QoS issue is associated with the satellite MDS 102, the analytics server 120 may send a second notice related to the QoS issue to at least one component of the satellite MDS 102, to a maintenance controller 132 for the satellite MDS 102, or both. When the second notice is sent to the at least one component of the satellite MDS 102, the second notice may include one or more instructions to overcome the QoS issue. When the second notice is sent to the maintenance controller 132, the second notice may identify the QoS issue, may identify one or more likely causes of the QoS issue and probabilities that the one or more likely causes are the cause, may identify recommended tasks to be scheduled by the maintenance controller 132 for maintenance personnel, may identify whether one or more instructions where sent to at least one component of the satellite MDS 102 and what the instructions where configured to achieve, may include other information, or combinations thereof. The maintenance controller 132 may schedule maintenance personnel to perform particular tasks based on the second notice to overcome the QoS issue.

When the QoS issue is associated with the terrestrial MDS 104, the analytics server 120 may send a third notice related to the QoS issue to at least one component of the terrestrial MDS 104, to a maintenance controller 134 for the terrestrial MDS 104, or both. When the third notice is sent to the at least one component of the terrestrial MDS 104, the third notice may include one or more instructions to overcome the QoS issue. When the third notice is sent to the maintenance controller 134, the third notice may identify the QoS issue, may identify one or more likely causes of the QoS issue and probabilities that the one or more likely causes are the cause, may identify recommended tasks to be scheduled by the maintenance controller 134 for maintenance personnel, may identify whether one or more instructions where sent to at least one component of the terrestrial MDS 104 and what the instructions where configured to achieve, may include other information, or combinations thereof. The maintenance controller 134 may schedule maintenance personnel to perform particular tasks based on the third notice to overcome the QoS issue.

Thus, the system 100 enables a service provider to identify and address potential QoS issues associated with providing media content to first subscribers via the satellite MDS 102 and providing media content to second subscribers via the terrestrial MDS 104. The system 100 may use an analytics server 120 to perform an analysis of first QoS data 124 received from the satellite MDS 102 and second QoS data 128 received from the terrestrial MDS 104. The analysis may determine whether QoS issues are associated with the combined content source 106, the satellite MDS 102, the terrestrial MDS 104, or combinations thereof. The analytics server 120 may send notices that enable correction of QoS issues via instructions to network components or via use of maintenance controllers correct QoS issues or to schedule maintenance personnel to address identified QoS issues.

Figure 2:
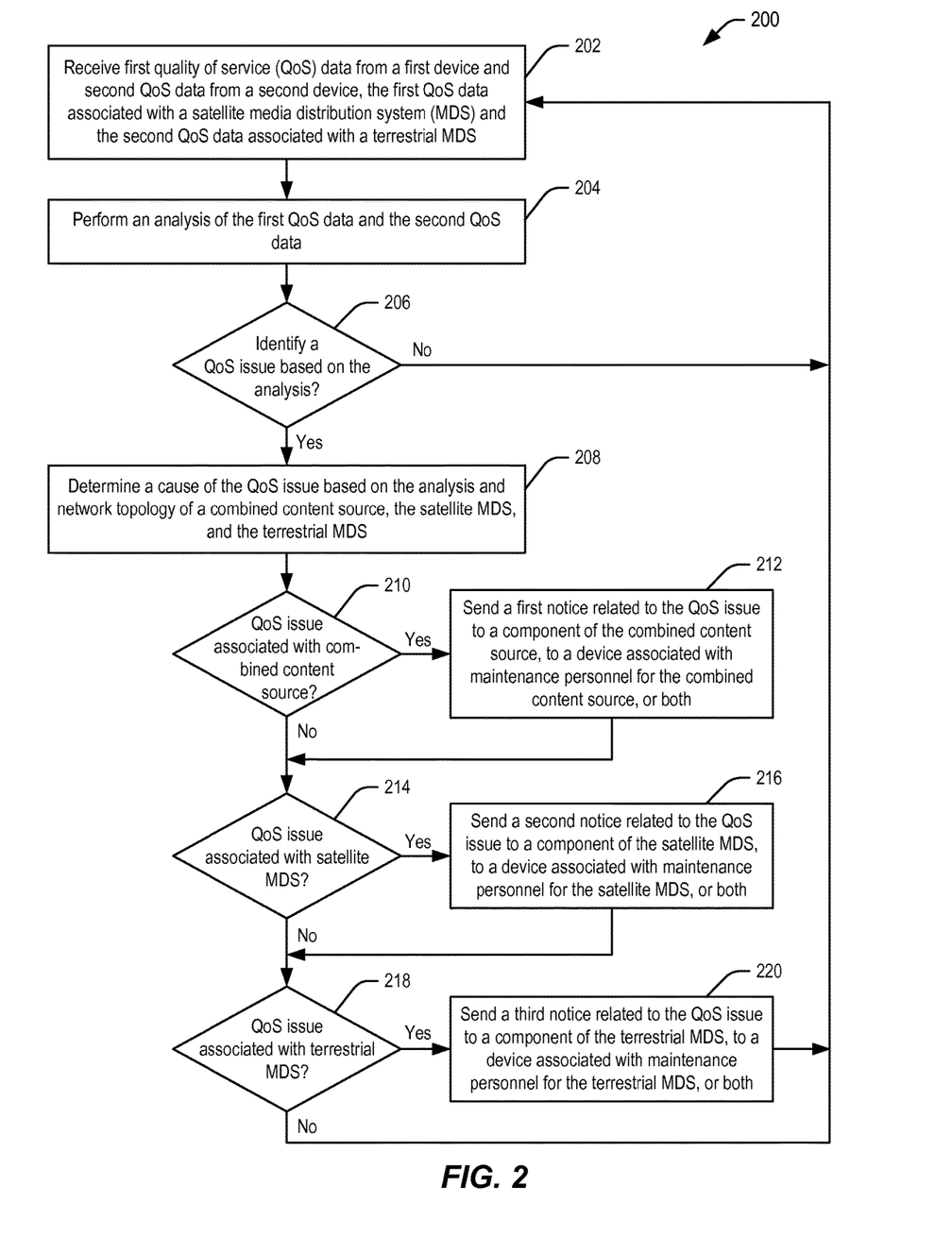
FIG. 2 is a flowchart of an embodiment of a method of controlling quality of service (QoS) provided by a MDS to subscribers of a service provider, where the service provider provides media content to the subscribers via satellite MDS and a terrestrial MDS.

Referring to FIG. 2, a flowchart that illustrates an embodiment of a method 200 of managing quality of service for systems associated with a service provider that provides a satellite MDS and a terrestrial MDS. The method 200 may be performed by an analytics server (e.g., the analytics server 120 of FIG. 1). The analytics server may be a part of a virtual cloud so that tasks performed by the analytics server may be accomplished via distributed processing by several different servers. The method may include receiving first QoS data from first devices and second QoS data from second devices, at 202. The first QoS data may be associated with the satellite MDS and the second QoS data may be associated with the terrestrial MDS.

The first devices and the second devices may be CPE devices of subscribers of the service provider. Each first device may generate particular first QoS data based on analysis of data packets received for one or more user devices coupled to the first device and may send the first QoS data to the analytics server. Similarly, each second device may generate particular second QoS data based on analysis of data packets received for one or more user devices coupled to the second device and may send the particular second QoS data to the analytics server. The analytics server may receive first QoS data from CPE devices associated with subscribers of the service provider that subscribe to the satellite MDS or from a selected group of CPE devices that are representative of the subscribers of the service provider that subscribe to the satellite MDS. The analytics server may receive second QoS data from CPE devices associated with subscribers of the service provider that subscribe to the terrestrial MDS or from a selected group of CPE devices that are representative of the subscribers of the service provider that subscribe to the terrestrial MDS.

In addition to the first QoS data from the first devices and the second QoS data from the second devices, the analytics server may receive third QoS data from one or more network devices of the satellite MDS. The analytics server may also receive fourth QoS data from one or more network devices of the terrestrial MDS. The analytics server may also receive fifth QoS data from one or more devices of the combined content source. The third QoS data, the fourth QoS data, and the fifth QoS data may enable the analytics server to identify a source of a QoS issue detected by the analytics server.

First QoS data and second QoS data received by the analytics server may include information about data packets associated with particular content that the service provider is sending to one or more subscribers. The information may include, but is not limited to, identification information of a device associated with the QoS data, identification of the particular content, jitter information, dropped packet information, latency information, number of packet retransmission requests made by the CPE device 108, time information, other data pertaining to QoS, or combinations thereof.

The analytics server may perform an analysis of the first QoS data and the second QoS data, at 204. The analysis may generate satellite MDS performance metrics and trends for the satellite MDS from the first QoS data. The analysis may also generate terrestrial MDS performance metrics and trends for the terrestrial MDS performance metrics from the second QoS data.

The analytics server may determine whether one or more QoS issues are identified based on the analysis, at 206. The one or more QoS issues may be identified based on comparisons of satellite MDS performance metrics, trends for the satellite MDS performance metrics, or both, to satellite MDS thresholds; based on comparisons of terrestrial MDS performance metrics, trends for the terrestrial MDs performance metrics, or both, to terrestrial MDS thresholds; based on comparisons of particular satellite MDS performance metrics to corresponding terrestrial MDS performance metrics, based on other comparisons; or based on combinations thereof. The satellite MDS thresholds and the terrestrial MDS thresholds may enable detection of QoS issues before the QoS issues result in noticeable changes to QoS of media content provided to subscribers. The analytics server may use pre-defined logical rules and data signatures based on usage history to identify patterns, anomalies, or both, that indicate QoS issues. When the analytics server does not identify one or more QoS issues, the method 200 may return to 202.

When the analytics server identifies one or more QoS issues, the analytics server may determine one or more causes of the one or more QoS issues based on the analysis and network topology (e.g., logical and physical) of a combined content source of the satellite MDS and the terrestrial MDS, the satellite MDS, and the terrestrial MDS, at 208. The analytics server may associate the QoS issue with the combined content source, with the satellite MDS, with the terrestrial MDS, or with combinations thereof. The analytics server may assign probabilities associated with the one or more QoS issues being associated with particular systems, with particular network devices of particular systems, or with combinations thereof, based on the third QoS data, the fourth QoS data, the fifth QoS data, or combinations thereof. When a probability that a QoS issue is caused by a particular system is above a particular threshold, the analytics server may associate the problem with the particular system. The QoS issue may be associated with more than one of the combined content source, the satellite MDS, and the terrestrial MDS.

For example, the analysis may indicate that at a particular time, a trend of lost packets for the satellite MDS increased above a particular threshold indicating a QoS issue. The analysis may also indicate that the trend of lost packets for the terrestrial MDS is increasing, but not at or above a threshold indicating a QoS issue. The analysis may determine that a probability that a QoS issue is associated with the satellite MDS is above a threshold and that a probability that a QoS issue is associated with the combined content source is also above the threshold. In response, the method 200 may proceed as if a QoS issue is identified with respect to the satellite MDS and with respect to the combined content source.

When the analytics server determines that a QoS issue is associated with the combined content source, at 210, the analytics server may send a first notice related to the QoS issue to at least one component of the combined content source, to a maintenance controller for the combined content source, or both, at 212. When the first notice is sent to the at least one component of the combined content source, the first notice may include one or more instructions to overcome the QoS issue. For example, the one or more instructions may cause use of a particular server that receives content from a content provider to be switched to a backup server. When the first notice is sent to the maintenance controller, the first notice may identify the QoS issue, may identify one or more likely causes of the QoS issue and probabilities that the one or more likely causes are the cause, may identify recommended tasks to be scheduled by the maintenance controller for maintenance personnel, may identify whether one or more instructions where sent to the at least one component of the combined content source and what the instructions where configured to achieve, may include other information, or combinations thereof. The maintenance controller may send instructions to one or more network devices to correct the QoS issue or may schedule maintenance personnel to perform particular tasks based on the first notice to overcome the QoS issue. The method 200 may then continue, at 214.

When the analytics server determines that the QoS issue is not associated with the combined content source, at 210, or after the analytics server sends the first notice, at 212, the analytics server may determine whether the QoS issue is associated with the satellite MDS, at 214. When the QoS issue is associated with the satellite MDS, the analytics server may send a second notice related to the QoS issue to at least one component of the satellite MDS, to a maintenance controller for the satellite MDS, or both, at 216. When the second notice is sent to the at least one component of the satellite MDS, the second notice may include one or more instructions to overcome the QoS issue. For example, the one or more instructions may cause packets to be rerouted so that a packet load handled by a particular component of the satellite MDS is reduced. When the second notice is sent to the maintenance controller, the second notice may identify the QoS issue, may identify one or more likely causes of the QoS issue and probabilities that the one or more likely causes are the cause, may identify recommended tasks to be scheduled by the maintenance controller for maintenance personnel, may identify whether one or more instructions where sent to at least one component of the satellite MDS and what the instructions where configured to achieve, may include other information, or combinations thereof. The maintenance controller may send instructions to one or more network devices to correct the QoS issue or may schedule maintenance personnel to perform particular tasks based on the second notice to overcome the QoS issue. The method 200 may then return to 202.

When the analytics server determines that the QoS issue is not associated with the satellite MDS, at 214, or after the analytics server sends the second notice, at 216, the analytics server may determine whether the QoS issue is associated with the terrestrial MDS, at 218. When the QoS issue is associated with the terrestrial MDS, the analytics server may send a third notice related to the QoS issue to at least one component of the terrestrial MDS, to a maintenance controller for the terrestrial MDS, or both, at 220. When the third notice is sent to the at least one component of the terrestrial MDS, the third notice may include one or more instructions to overcome the QoS issue. For example, the one or more instructions may cause a particular CPE device that consistently indicates QoS issues to run diagnostic instructions to determine whether the particular CPE device is functioning properly. When the third notice is sent to the maintenance controller, the third notice may identify the QoS issue, may identify one or more likely causes of the QoS issue and probabilities that the one or more likely causes are the cause, may identify recommended tasks to be scheduled by the maintenance controller for maintenance personnel, may identify whether one or more instructions where sent to at least one component of the terrestrial MDS and what the instructions where configured to achieve, may include other information, or combinations thereof. The maintenance controller may send instructions to one or more network devices to correct the QoS issue or may schedule maintenance personnel to perform particular tasks based on the third notice to overcome the QoS issue. The method 200 may then return to 202.

When the analytics server determines that the QoS issue is not associated with the terrestrial MDS, at 218, the method 200 may return to 202. In some embodiments, the analytics server may, at particular times, determine whether the QoS issue was fixed. When the QoS issue was fixed, the analytics server may send a follow up notice for each of the first notice, second notice, and third notice that the analytics server sent related to the QoS issue. The follow up notice may indicate that the QoS issue was fixed. When the QoS issue was not fixed, the analytics server may send a follow up notice for each of the first notice, second notice, and third notice that the analytics server sent related to the QoS issue. The follow up notice may indicate that the QoS issue was not fixed.

Thus, the method 200 of FIG. 2 enables the analytics server to perform an analysis of first data associated with QoS of the satellite MDS and of second data associated with QoS of the terrestrial MDS. The analysis may be used to identify QoS issues and to address the QoS issues by sending instructions to one or more systems associated with the QoS issues to reduce or eliminate the QoS issues or by sending notices to one or more maintenance controllers to enable the one or more maintenance controllers to schedule maintenance personnel to address the QoS issues.

Various embodiments disclosed herein describe a service provider that provides media content to first subscribers via a satellite MDS and provides media content to second subscribers via a terrestrial MDS. An analytics server may leverage sets of subscriber data to identify QoS issues of a combined content source for the satellite MDS and the terrestrial MDS, to identify QoS issues of the satellite MDS, to identify QoS issues of the terrestrial MDS, or combinations thereof. The analytics server may perform an analysis of first QoS data received from CPE devices associated with the satellite MDS and second QoS data received from CPE devices associated with the terrestrial MDS. The analysis may be used to identify one or more QoS issues associated with the combined content source, associated with the satellite MDS, associated with the terrestrial MDS, or associated with combinations thereof. Leveraging sets of subscriber data may enable identification of QoS issues before the issues result in reductions in QoS noticeable to subscribers, may reduce costs in identifying and responding to QoS issues, may reduce a response time to respond to QoS issues, may identify particular systems or network devices of the service provider systems associated with the QoS issues, or combinations thereof.

Figure 3:
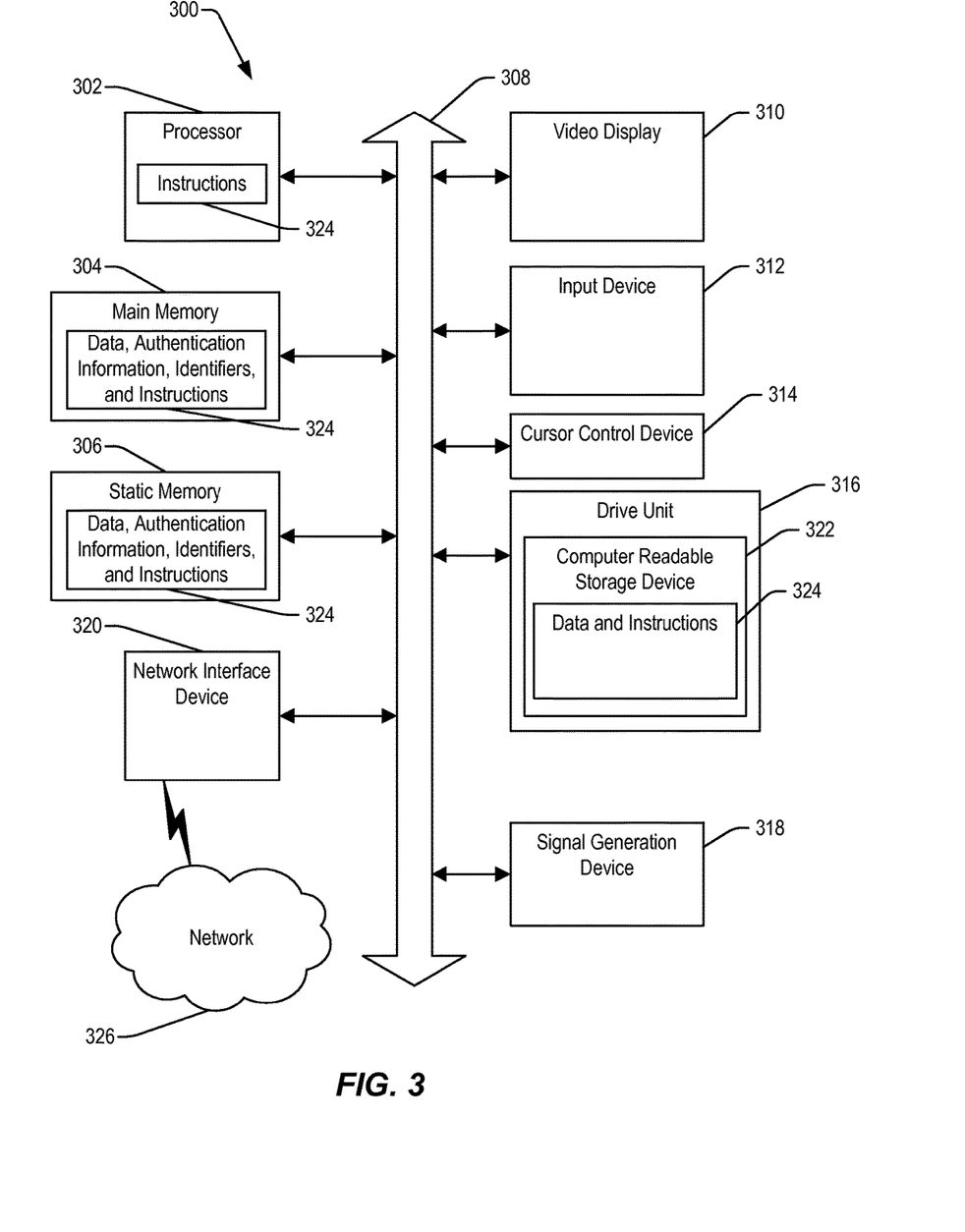
FIG. 3 is a block diagram of an illustrative embodiment of a general computer system.

Referring to FIG. 3, an illustrative embodiment of a general computer system is shown and is designated 300. The computer system 300 includes a set of instructions (e.g., the instructions 324 in the memory 304) that can be executed to cause the computer system 300 to perform any one or more of the methods or computer based functions disclosed herein. The computer system 300 may operate as a standalone device or may be connected (e.g., using a network) to other computer systems or peripheral devices. For example, the computer system 300 may include or may be included within any one or more of components of the satellite MDS 102, components of the terrestrial MDS 104, components of the combined content source 106, CPE devices 108, satellites 110, user devices 112, CPE devices 114, analytic server 120, maintenance controllers 130-134, or combinations thereof described with reference to FIG. 1.

In a networked deployment, the computer system 300 may operate in the capacity of a server or as a client user computer in a server-client user network environment, or as a peer computer system in a peer-to-peer (or distributed) network environment. The computer system 300 may also be implemented as or incorporated into various devices, such as a server, a network device, a mobile device, a palmtop computer, a laptop computer, a desktop computer, a communications device, a wireless telephone, a personal computer (PC), a tablet PC, a personal digital assistant (PDA), a set-top box (STB) device, a media playback device, a customer premises equipment device, an endpoint device, a web appliance, or any other machine capable of executing a set of instructions (sequential or otherwise) that specify actions to be taken by that machine. In a particular embodiment, the computer system 300 may be implemented using electronic devices that provide video, audio, data communication, or combinations thereof. Further, while a single computer system 300 is illustrated, the term "system" shall also be taken to include any collection of systems or sub-systems that individually or jointly execute a set, or multiple sets, of instructions to perform one or more computer functions.

As illustrated in FIG. 3, the computer system 300 may include a processor 302 (e.g., a central processing unit (CPU), a graphics processing unit (GPU), or both). Moreover, the computer system 300 may include a main memory 304 and a static memory 306, which can communicate with each other via a bus 308. As shown, the computer system 300 may further include a video display unit 310, such as a liquid crystal display (LCD), a light emitting diode (LED) display, a touch screen display, a flat panel display, a solid state display, or a lamp assembly of a projection system. Additionally, the computer system 300 may include an input device 312, such as a remote control device (e.g., a television remote or a set-top box remote), a keyboard, a joystick, another type of input device, or combinations thereof. In addition, the computer system 300 may include a cursor control device 314 (e.g., a mouse). In some embodiments, the input device 312 and the cursor control device 314 may be integrated into a single device, such as a capacitive touch screen input device. The computer system 300 may also include a drive unit 316, a signal generation device 318, such as a speaker or remote control, and a network interface device 320. Some computer systems 300 may not include an input device (e.g., a server may not include an input device).

In a particular embodiment, as depicted in FIG. 3, the drive unit 316 may include a computer-readable storage device 322 in which authentication information and one or more sets of instructions 324, e.g. software, can be embedded. The computer-readable storage device 322 may be random access memory (RAM), read-only memory (ROM), programmable read-only memory (PROM), erasable PROM (EPROM), electrically erasable PROM (EEPROM), one or more registers, solid-state memory, one or more hard disks, one or more removable disks, compact disc read-only memory (CD-ROM), other optical disk storage, magnetic disk storage, magnetic storage devices, or any other storage device usable to store program code in the form of instructions or data and that can be accessed by a computer and/or a processor. A computer-readable storage device is not a signal.

Further, the instructions 324 may embody one or more of the methods or logic as described herein. The instructions 324 may be executable by the processor 302 to perform one or more functions or methods described herein, such as the method 200 described with reference to FIG. 2. In a particular embodiment, data and instructions (e.g., instructions to analyze first data received from CPE devices associated with the satellite MDS and second data received from CPE devices associated with the terrestrial MDS) 324 may reside completely, or at least partially, within the main memory 304, the static memory 306, and/or within the processor 302 during execution by the computer system 300. The main memory 304 and the processor 302 also may include a computer-readable storage device.

In an alternative embodiment, dedicated hardware implementations, such as application specific integrated circuits, programmable logic arrays and other hardware devices, may be constructed to implement one or more of the methods described herein. Various embodiments may include a variety of electronic and computer systems. One or more embodiments described herein may implement functions using two or more specific interconnected hardware modules or devices with related control and data signals that can be communicated between and through the modules, or as portions of an application-specific integrated circuit (ASIC). Accordingly, the present system encompasses software, firmware, and hardware implementations.

In accordance with various embodiments of the present disclosure, the methods described herein may be implemented by software programs executable by a computer system, a processor, or a device, which may include forms of instructions embodied as a state machine implemented with logic components in an ASIC or a field programmable gate array (FPGA) device. Further, in an exemplary, non-limiting embodiment, implementations may include distributed processing, component/object distributed processing, and parallel processing. Alternatively, virtual computer system processing may be constructed to implement one or more of the methods or functionality described herein. It is further noted that a computing device, such as a processor, a controller, a state machine or other suitable device for executing instructions to perform operations may perform such operations directly or indirectly by way of one or more intermediate devices directed by the computing device.

The computer system 300 may communicate with one or more external systems via a network 326. First data stored by the computer-readable storage device 322 may be sent to the one or more external systems via the network 326. Also, second data may be received by the computer system 300 via the network 326. The second data may be stored by the processor 324 to the computer-readable storage device. Additionally, while the computer-readable storage device 322 is shown to be a single device, the computer-readable storage device 322 may be a single device or may be multiple devices, such as a centralized or distributed database, and/or associated caches and servers that store one or more sets of instructions. The computer-readable storage device 322 is capable of storing a set of instructions for execution by the processor 302 to cause the computer system 300 to perform any one or more of the methods or operations disclosed herein.

In a particular non-limiting, exemplary embodiment, the computer-readable storage device 322 may include a solid-state memory such as embedded memory (or a memory card or other package that houses one or more non-volatile read-only memories). Further, the computer-readable storage device 322 may include a random access memory or other volatile re-writable memory. Additionally, the computer-readable storage device 322 may include a magneto-optical or optical device, such as a disk or tapes or other storage device. Accordingly, the disclosure is considered to include any one or more of a computer-readable storage device and other equivalents and successor devices, in which data or instructions may be stored.

Although the one or more components and functions may be described herein as being implemented with reference to particular standards or protocols, the disclosure is not limited to such standards and protocols. Such standards are from time-to-time superseded by faster or more efficient equivalents having essentially the same functions. Wireless standards for short-range communications and long-range communications can be used by the computer system 300 in selected embodiments.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Figures are also merely representational and may not be drawn to scale. Accordingly, the disclosure and the figures are to be regarded as illustrative rather than restrictive.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order unless expressly stated. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be implemented as multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, an application specific integrated circuit, and/or a programmable gate array (PGA) including a FPGA. In one or more embodiments, when a processor executes instructions to perform "operations", this can include the processor performing the operations directly and/or facilitating, directing, or cooperating with another device or component to perform the operations.

The Abstract is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
   receiving, at a processor of a server, first quality of service data from a first device and second quality of service data from a second device, the first quality of service data associated with a satellite media distribution system and the second quality of service data associated with a terrestrial media distribution system;
   performing an analysis of the first quality of service data and the second quality of service data at the processor to identify a quality of service issue based on the analysis, wherein the performing the analysis comprises:
      generating satellite media distribution system performance metrics and trends from the first quality of service data;
      comparing the satellite media distribution system performance metrics and trends to satellite media distribution system thresholds;
      generating terrestrial media distribution system performance metrics and trends from the second quality of service data; and
      comparing the terrestrial media distribution system performance metrics and trends to terrestrial media distribution system thresholds; and
   in response to a first determination that the quality of service issue is caused by a combined content source of the satellite media distribution system and the terrestrial media distribution system:
      sending an instruction from the server to a component of the combined content source to address the quality of service issue, wherein the combined content source receives media content for the satellite media distribution system and the terrestrial media distribution system from content providers; and
      sending a first notice from the server to a maintenance controller for the combined content source, wherein the first notice identifies the instruction sent to the component of the combined content source and what the instruction was configured to achieve.

2. The method of claim 1, further comprising determining a potential cause of the quality of service issue based on the analysis and a network topology of the combined content source, the satellite media distribution system, and the terrestrial media distribution system.

3. The method of claim 2, wherein the first notice identifies the potential cause of the quality of service issue.

4. The method of claim 3, wherein the first notice further comprises an identifier of a probability of the potential cause being an actual cause of the quality of service issue.

5. The method of claim 1, wherein the first notice identifies potential causes of the quality of service issue, each potential cause of the potential causes having an associated probability of being an actual cause of the quality of service issue, and wherein each associated probability value is above a threshold value.

6. The method of claim 1, further comprising, in response to a second determination that the quality of service issue is a satellite quality of service issue, sending a second notice related to the satellite quality of service issue from the server to a component of the satellite media distribution system, a device associated with maintenance personnel for the satellite media distribution system, or both.

7. The method of claim 1, further comprising, in response to a second determination that the quality of service issue is a terrestrial quality of service issue, sending a second notice related to the terrestrial quality of service issue from the server to a component of the terrestrial media distribution system, a device associated with maintenance personnel for the terrestrial media distribution system, or both.

8. The method of claim 1, wherein the combined content source is a system configured to perform operations using distributed processing at multiple servers.

9. A system comprising:
   a processor;
   a memory in communication with the processor, the memory including instructions executable by the processor to perform operations including:
      receiving first quality of service data from a first device and second quality of service data from a second device, the first quality of service data associated with a satellite media distribution system and the second quality of service data associated with a terrestrial media distribution system;
      performing an analysis of the first quality of service data and the second quality of service data to identify a quality of service issue based on the analysis, wherein the performing the analysis comprises:
         generating satellite media distribution system performance metrics and trends from the first quality of service data;
         comparing the satellite media distribution system performance metrics and trends to satellite media distribution system thresholds;
         generating terrestrial media distribution system performance metrics and trends from the second quality of service data; and comparing the terrestrial media distribution system performance metrics and trends to terrestrial media distribution system thresholds; and in response to a first determination that the quality of service issue is caused by a combined content source of the satellite media distribution system and the terrestrial media distribution system:

sending an instruction to a component of the combined content source to overcome the quality of service issue, wherein the combined content source receives media content for the satellite media distribution system and the terrestrial media distribution system from content providers; and sending a first notice to a maintenance controller for the combined content source, wherein the first notice identifies the instruction sent to the component of the combined content source and what the instruction was configured to achieve.

10. The system of claim 9, further comprising determining a potential cause of the quality of service issue based on the analysis and a network topology of the combined content source, the satellite media distribution system, and the terrestrial media distribution system.

11. The system of claim 10, wherein the first notice identifies the potential cause of the quality of service issue.

12. The system of claim 11, wherein the first notice further comprises an identifier of a probability of the potential cause being an actual cause of the quality of service issue.

13. The system of claim 11, wherein the first notice enables the maintenance controller to perform tasks or schedule maintenance personnel to perform tasks to overcome the quality of service issue based on the first notice.

14. The system of claim 9, further comprising, in response to a second determination that the quality of service issue is a satellite quality of service issue, sending a second notice related to the satellite quality of service issue to a component of the satellite media distribution system, a device associated with maintenance personnel for the satellite media distribution system, or both.

15. The system of claim 9, further comprising, in response to a second determination that the quality of service issue is a terrestrial quality of service issue, sending a second notice related to the terrestrial quality of service issue to a component of the terrestrial media distribution system, a device associated with maintenance personnel for the terrestrial media distribution system, or both.

16. A computer-readable storage device storing instructions executable by a processor to perform operations comprising:

receiving first quality of service data from a first device and second quality of service data from a second device, the first quality of service data associated with a satellite media distribution system and the second quality of service data associated with a terrestrial media distribution system;

performing an analysis of the first quality of service data and the second quality of service data, wherein the performing the analysis comprises:

generating satellite media distribution system performance metrics and trends from the first quality of service data;

comparing the satellite media distribution system performance metrics and trends to satellite media distribution system thresholds;

generating terrestrial media distribution system performance metrics and trends from the second quality of service data; and comparing the terrestrial media distribution system performance metrics and trends to terrestrial media distribution system thresholds;

identifying a quality of service issue based on the analysis; and in response to a first determination that the quality of service issue is caused by a combined content source of the satellite media distribution system and the terrestrial media distribution system:

sending an instruction to a component of the combined content source to overcome the quality of service issue, wherein the combined content source receives media content for the satellite media distribution system and the terrestrial media distribution system from content providers; and sending a first notice to a maintenance controller for the combined content source, wherein the first notice identifies the instruction sent to the component of the combined content source and what the instruction was configured to achieve.

17. The computer-readable storage device of claim 16, wherein the operations further comprise determining a potential cause of the quality of service issue based on the analysis and a network topology of the combined content source, the satellite media distribution system, and the terrestrial media distribution system.

18. The computer-readable storage device of claim 16, wherein the operations further comprise, in response to a second determination that the quality of service issue is a satellite quality of service issue, sending a second notice related to the satellite quality of service issue to a component of the satellite media distribution system, a device associated with maintenance personnel for the satellite media distribution system, or both.

19. The computer-readable storage device of claim 16, wherein the operations further comprise, in response to a second determination that the quality of service issue is a terrestrial quality of service issue, sending a second notice related to the terrestrial quality of service issue to a component of the terrestrial media distribution system, a device associated with maintenance personnel for the terrestrial media distribution system, or both.

20. The computer-readable storage device of claim 16, wherein the combined content source includes antennas, receivers, encoders, multiplexers, servers, or combinations thereof.

* * * * *